United States Patent [19]
Dahl

[11] Patent Number: 5,403,026
[45] Date of Patent: Apr. 4, 1995

[54] CROP DEFLECTOR FOR SELF-PROPELLED VEHICLE

[75] Inventor: Dennis A. Dahl, Lincoln, N. Dak.

[73] Assignee: Clark Equipment Company, South Bend, Ind.

[21] Appl. No.: 84,733

[22] Filed: Jun. 29, 1993

[51] Int. Cl.⁶ .............................................. B62D 25/18
[52] U.S. Cl. ..................................... 280/156; 172/517
[58] Field of Search ............... 280/156, 157, 160, 847, 280/848, 849, 154; 293/58; 172/508, 517

[56] References Cited

U.S. PATENT DOCUMENTS

| | | | |
|---|---|---|---|
| 1,811,054 | 6/1931 | Kipp et al. | 280/160 |
| 1,991,777 | 2/1935 | Vaughn | 280/96.2 |
| 2,473,978 | 6/1949 | Van Buskirk | 56/119 |
| 2,530,053 | 11/1950 | Glass | 97/192 |
| 2,690,342 | 9/1954 | Willey | 280/160 |
| 4,746,065 | 5/1988 | Gorder | 239/168 |
| 5,074,573 | 12/1991 | Dick | 280/157 |

OTHER PUBLICATIONS

Brochure on the 230 SPRA Coupe, 1989 no date.

*Primary Examiner*—Margaret A. Focarino
*Assistant Examiner*—Paul N. Dickson
*Attorney, Agent, or Firm*—Westman, Champlin & Kelly

[57] ABSTRACT

A crop deflector for use with a self-propelled vehicle having a frame, a wheel, and a shock absorbing suspension assembly mounting the wheel to the frame. A deflector frame is coupled to the wheel such that the deflector frame steers with the wheel as the deflector frame pivots in a main support on the suspension assembly such that the deflector frame does not move directly with the wheel when the wheel is loaded by contact with rough ground surface. A deflector shield is attached to the deflector frame for interacting with the crop rows. In a preferred embodiment, the deflector frame is pivotally connected to the suspension assembly by a bushing such that the deflector frame pivots about the steering axis of the wheel so it turns with the wheel. A steering arm connected to the wheel support and to the deflector frame steers the crop deflector thereby causing the deflector frame to pivot about the steering axis.

15 Claims, 4 Drawing Sheets

CROP DEFLECTOR FOR SELF-PROPELLED VEHICLE

BACKGROUND OF THE INVENTION

The present invention relates to a deflector shield for a wheel of a vehicle, and more particularly, to a crop deflector for a steerable wheel of a self-propelled vehicle which is mounted to a portion of a frame of the vehicle which is shock dampened and yet moves as the wheel is steered.

The plants of row crops branch out, block and fill the space between rows. When a vehicle is used for work on the row-grown crops, such as for cultivating or for spraying the crops, the vehicle runs between the rows and its wheels beat down and crush the portion of the crop extending into the space, thereby causing considerable damage to the crop.

Deflector shields or fenders have been placed around each wheel of vehicles for turning aside fallen or leaning stalks so that they are not run over by the wheels of the vehicle, but are instead, pushed aside and lifted into a substantially vertical position. It is known to attach these deflector shields directly to the axle of the vehicle wheel such that the deflector shield is steerable with the wheel for proper positioning of the deflector shield with respect to the wheel. However, one of the problems associated with this type of steerable crop deflector is that the constant undampened shock loads and vibration of the wheel against the ground surface causes the crop deflector to shake apart and eventually fail.

It is therefore desirable to provide a deflector shield which is steerable with the wheel, yet which moves independent of the wheel so that it is not subject to the constant direct shock loading imparted by the wheel traveling over rough ground.

SUMMARY OF THE INVENTION

The present invention relates to a crop deflector for use with a self-propelled vehicle having a frame, a wheel, and a shock absorbing suspension mounting the wheel to the vehicle frame. A deflector frame is attached to the portion of the shock absorbing system which supports the frame. In other words, the deflector frame attaches to a portion of the frame which is vibration dampened. A deflector shield is attached to the deflector frame for deflecting crops from the wheel path. A linkage connected to the steering wheel also steers the deflector, while permitting the wheel to move vertically relative to the deflector.

In a preferred embodiment, the deflector frame is pivotally connected to an outer cylinder of a shock absorber by a bushing such that the deflector frame pivots about the axis of the cylinder, which is also the steering axis of the wheel. A steering arm connected to the wheel axle and to the deflector frame steers the crop deflector thereby causing the deflector frame to pivot about the cylinder axis. The wheel is supported on a telescoping insert inside the cylinder so there is relative movement of the wheel along the cylinder axis. A spring or other dampener then dampens the movement of the insert and the wheel.

DETAILED DESCRIPTION OF THE PREFERRED EMBODIMENTS

Figure 1:
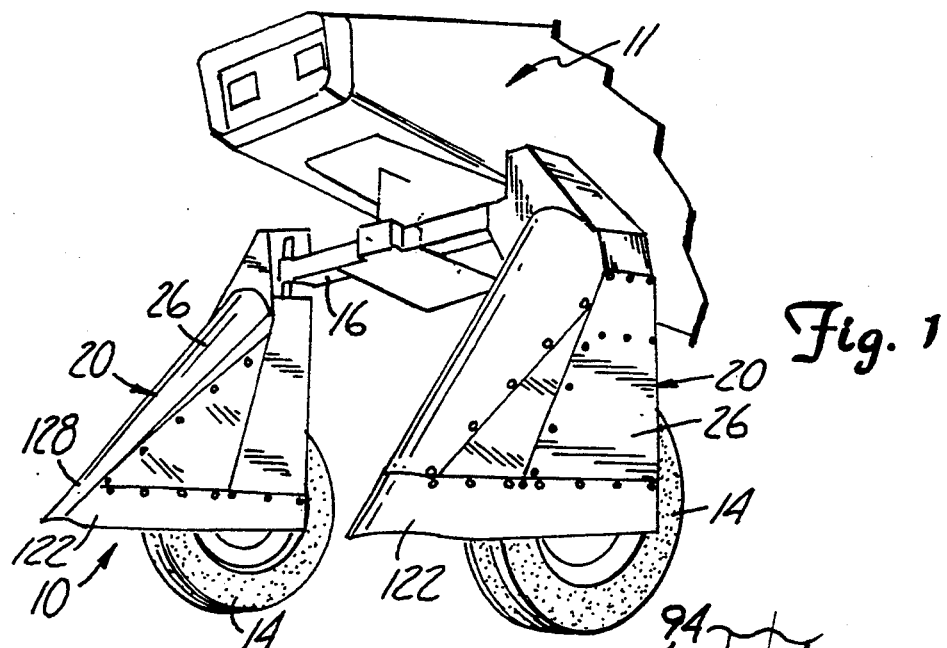
FIG. 1 is a perspective view of a first embodiment of a crop deflector of the present invention.
Figure 2:
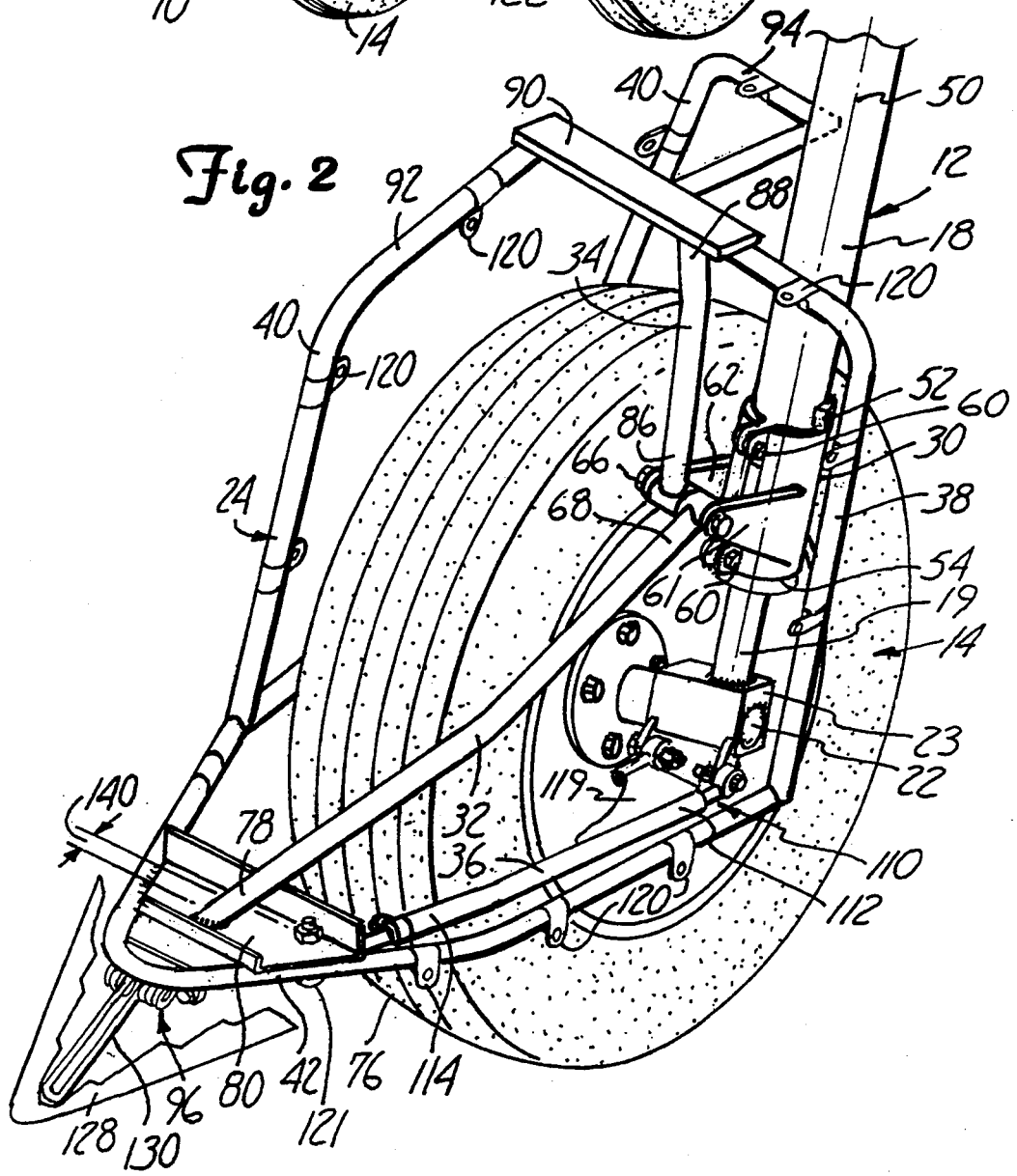
FIG. 2 is a perspective view of the crop deflector without the deflector shield.

FIGS. 1 and 2 show a conventional wheel assembly 10 of a crop sprayer 11 or other self-propelled vehicle, such as a tractor used for a cultivator. A conventional shock absorbing suspension or strut assembly 12 mounts a wheel 14 to a vehicle frame 16. A crop deflector 20 is mounted to cover and shield each wheel 14 of the sprayer 11 such that as the crop deflector 20 steers with the wheel 14. The deflector remains relatively unaffected by the wheel 14 loading caused by the wheel 14 contacting a ground surface.

The suspension assembly 12 includes a cylinder or strut housing 18 fixedly attached to the vehicle frame 16 at one end and extending outward therefrom towards the wheel 14 and a rod 19 telescopically mounted within the cylinder 18 and supported by springs (not shown) and by a pneumatic or hydraulic fluid, such as that used in McPherson struts. The rod 19 reciprocates along the axis of the cylinder 18 to provide shock absorption. A lower end of the rod 19 has an axle 22 for the wheel 14 fixed thereto through a housing 23. An upper end of the rod 19 extends out through the top of cylinder 18 and is steered through a conventional set of links and a hydraulic steering cylinder. The construction of the suspension assembly 12 and steering mechanism is well-known to those skilled in the art and is on units such as a self propelled sprayer sold by the Melroe business unit of Clark Equipment Company under the trademark SPRA-COUPE.

The crop deflector 20 includes a deflector frame 24 supported on the strut 18 of the suspension assembly 12, and a deflector shield 26 attached to the deflector frame 24.

Referring to FIG. 2, the deflector frame 24 is supported on a bushing 30, and includes a lower load arm 32, an upper load strut 34, a steering arm 36, an inner side frame member 38, an outer side frame member 40, and a forward frame member 42.

The bushing 30 is rotatably mounted to an outer surface of the cylinder 18 of the suspension assembly 12 such that the bushing 30 rotates about a longitudinal axis 50 of the cylinder 18 (which is the steering axis for wheel 14) to permit steering of the crop deflector 20 with the wheel 14. The bushing 30 is like a sleeve that fits over the outer surface of a lower portion of the strut 18. The bushing 30 represents the primary mounting of the deflector frame 24 to the suspension assembly 12 so that the shock absorption mounting of the rod 19 (which mounts the wheel 14) relative to the cylinder 18 insulates the deflector frame 24 from the continuous vertical loading received by the wheel 14 contacting a rough ground surface.

The cylinder 18 includes upper and lower collars 52 and 54, respectively, which retain the bushing 30 from vertical movement along the cylinder axis 50. The bushing 30 is a two piece unit which is split longitudinally and can be retained to surround the cylinder 18 through bolts 60. The bushing 30 is lubricated to rotate or pivot easily around the cylinder 18 and includes brackets 61 and 62 which extend forwardly from the bushing 30 toward a leading edge 76 of the wheel 14.

Figure 3:
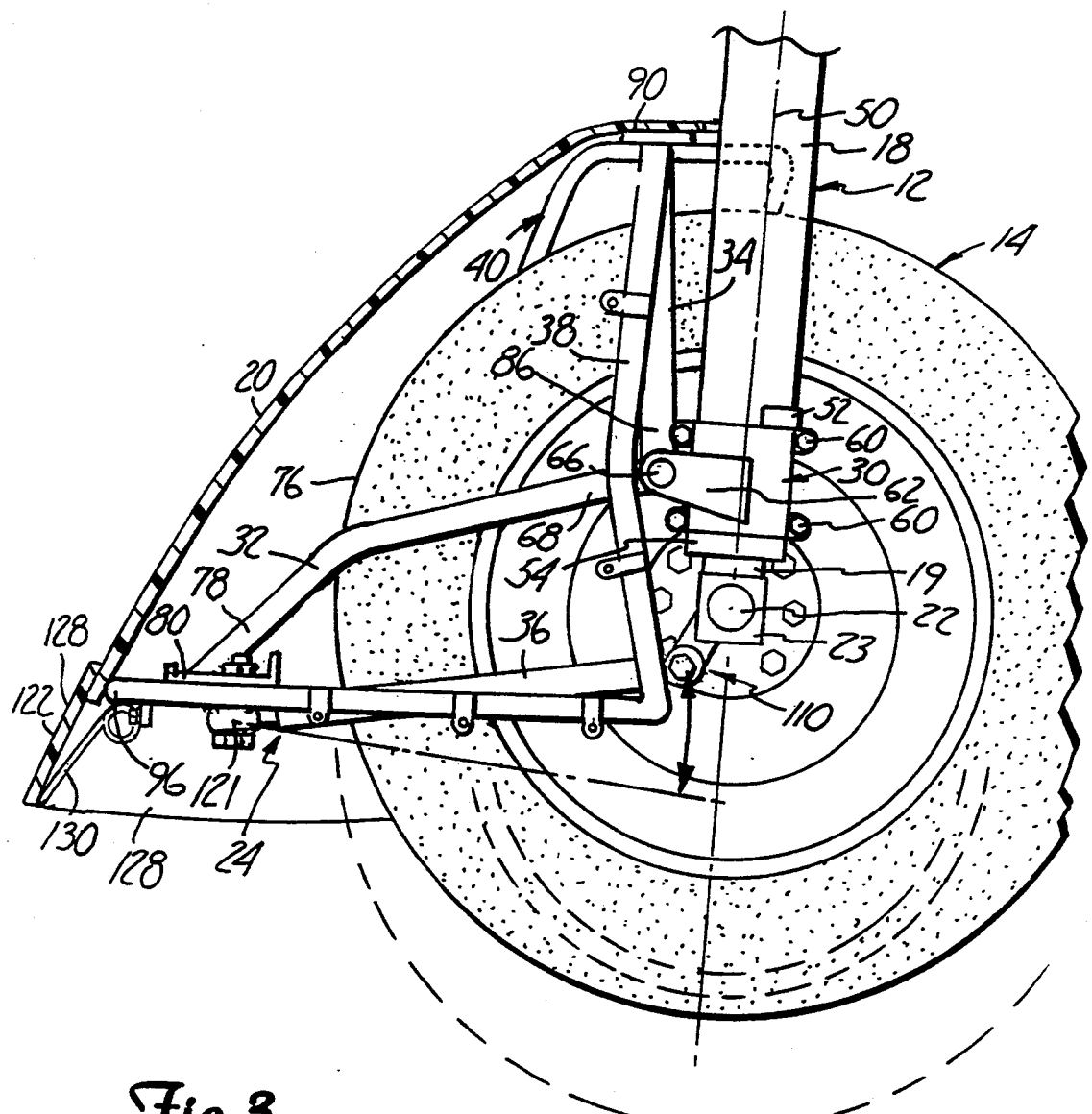
FIG. 3 is a side elevational view of the crop deflector taken from a first side of the wheel.

Referring to FIGS. 2 and 3, a first pivot pin 66 pivotally connects a first end 68 of the lower load arm 32 between the brackets 61 and 62. The lower load arm 32 is a tubular member having a bend therein such that the lower load arm 32 extends from a position adjacent and below the center of the wheel 14 to a position ahead of a leading edge 76 of the wheel 14. A second end 78 of the lower load arm 32 is attached to a first support plate 80 which is mounted on the forward frame member 42. The lower load arm 32 absorbs loads on the deflector frame 24 resulting from interaction with the crop rows.

The first pivot pin 66 connects a lower end 86 of an upper load strut 34 to the brackets 61 and 62 on bushing 30. The strut 34 extends upwardly and an upper end 88 of the upper load strut 34 is welded to an upper plate member 90 which connects the inner side frame member 38 to the outer frame member 40 above the wheel 14. The upper load strut 34 supports the deflector frame 24 and absorbs loads on the deflector frame 24 resulting from interaction with the crop rows.

Figure 4:
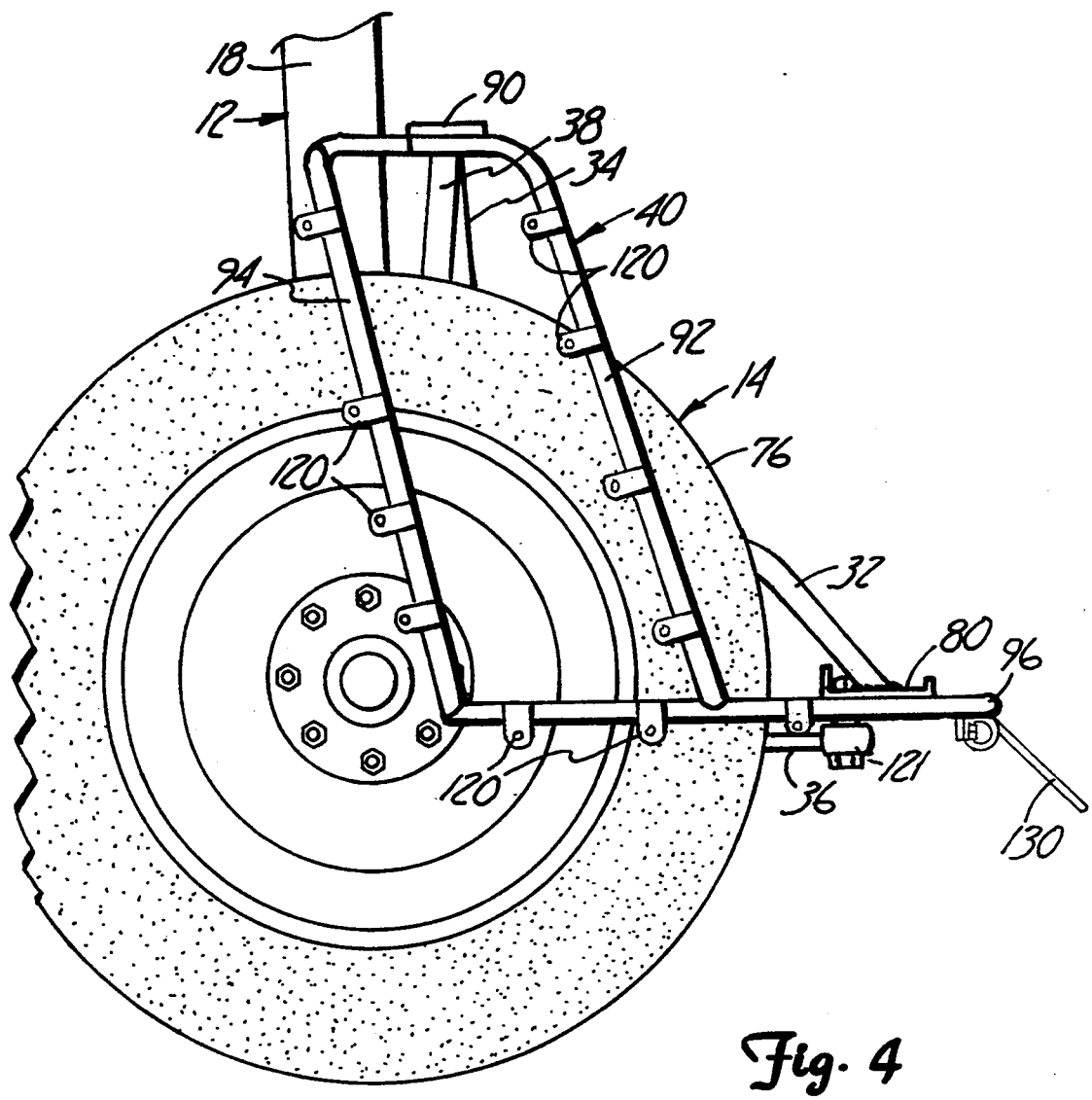
FIG. 4 is a side elevational view of the crop deflector taken from a second side of the wheel.

Referring to FIG. 4, the outer side frame member 40 includes a front upright 92 and a rear upright 94. The front upright 92 angles rearwardly and upwardly from a position nearly in the leading edge 76 of the wheel 14 and has a top member above the top of the wheel 14. The rear upright 94 is parallel to the front upright 92 and has a laterally extending top leg. The forward frame member 42 connects the lower ends of front and rear uprights 92 and 94. The lateral extending top leg of upright 94 connects to the inner frame member 38 to form the deflector frame 24. A nose 96 is formed by the forward frame member 42 ahead of the wheel 14. The second plate 90 is spaced a sufficient distance above the wheel 14 such that it does not contact the wheel 14 when the wheel 14 is loaded or is in operation.

Figure 2A:
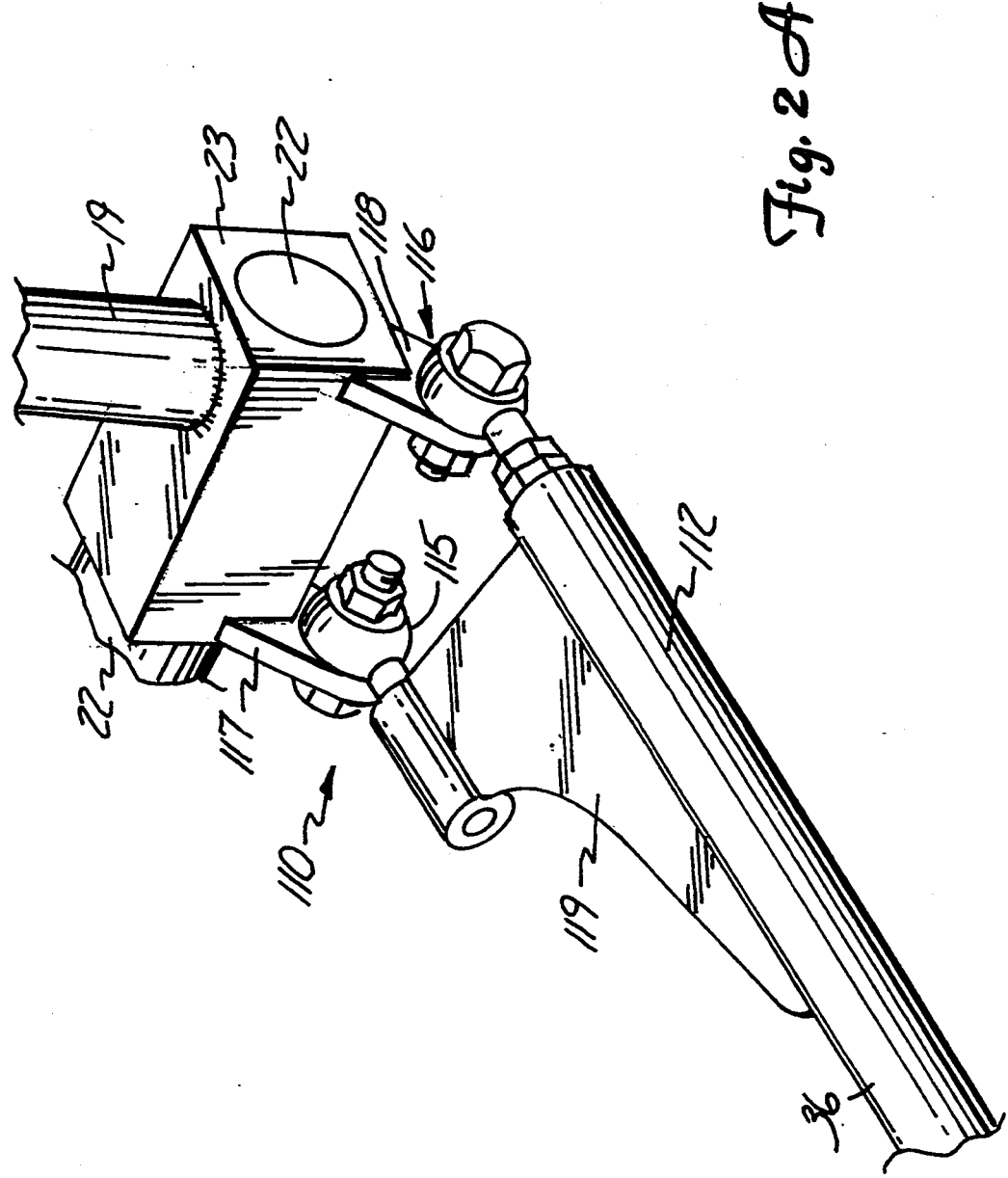
FIG. 2A is an enlarged perspective view of the wheel axle housing.

Referring back to FIGS. 2 and 2A, the steering arm 36 includes a pair of tubes joined together with a stabilizer plate 119 and supported on rod ends 115 and 116 which form a second pivot 110 that connects an inner end 112 of the steering arm 36 to the wheel axle housing 23. The rod ends have spherical bearings and are connected through brackets 117 and 118, so the steering arm 36 moves with the wheel axle 22 for steering the deflector frame 24. The spherical bearing rod ends 115 and 116 connect to the brackets 117 and 118, the brackets being fixed to housing 23. An outer end 114 of the steering arm 36 has a third pivot 121 which is a spherical bearing rod end which connects the steering arm 36 to the lower plate 80. The pivots 110 and 121 permit the wheel 14 to move vertically along axis 50 without binding while permitting the steering action. The pivot 121 has its mounting bolt extending up and down generally vertically.

Referring back to FIG. 1, the deflector shield 20 is typically constructed of suitable sheet material such as a plastic, fiberglass or metal and is mounted to the inner, outer and forward frame members 38, 40 and 42 by mounting tabs 120 evenly spaced along the deflector frame 24. The deflector shield 20 may be constructed of individual segments which are bolted or otherwise fixed together, although it can be a single member molded to fit around the deflector frame 24. A flexible skirt 122 is mounted around the bottom of the deflector shield 20 to prevent damage to the sheet metal deflector shield as the wheel assembly 10 traverses rough terrain. The skirt 122 is preferably constructed of a rubber or plastic material, but may be of any flexible material. The leading edge 128 of the deflector shield 20 and the deflector skirt 122 are angled from the front up and to the rear, as well as being rounded, so that the crop deflector 20 can get under the fallen crops and separate adjacent crop rows.

Referring to FIG. 2, a torsion spring 130 or other resilient member such as, for example, a gas spring is mounted to the deflector frame nose 96 and to the bottom of the flexible shield 122 at the leading edge 128 of the deflector shield 20 to support the leading edge and to prevent the leading edge 128 from buckling under as a result of loads imposed on the deflector shield 20 from the crop.

As mentioned above, the wheel 14 bounces up and down by going over rough ground and the rod 19 reciprocates within the cylinder 18. The relative movement between the wheel 14 and deflector frame 24 causes pivoting movement of the arm 36 and up and down movement of the spherical rod ends, including the rod end at pivot 121. The steering action continues to work regardless of movement of wheel 14 up and down. To avoid binding of the deflector frame 24, the pivots of the steering arm 36 and the pivot 66 are spaced apart by a distance 140 selected in relation to the length of the steering arm so the deflector frame 24 remains relatively stationary as the wheel 14 moves up and down.

The wheel 14 is capable of movement relative to the strut cylinder 18 from a centered position in both directions to extend or compress. The radius of the steering arm 36 is made to be long and as the wheel moves either up or down from its rest or static position during use, the change of position of the pivot 121 in fore and aft direction is kept minimal. In other words, the inner end 112 of the arm 36 is allowed to move up and down with the wheel axle 22 while the deflector frame 24 remains stationary.

Referring to FIG. 3, the wheel 14 is shown in solid lines under a load when the rod 19 is forced up into the strut cylinder 18. In this position, the load arm 32 pivots about the first pivot 66 to permit the wheel 14 to move upward within the deflector frame 24. The steering arm 36 pivots about the second pivot 110 as the wheel 14 moves upward such that the steering arm 36 pivots in substantial synchronization with the load arm 32 and such that the relative position of the deflector frame 24 does not substantially change as the wheel 14 is loaded. The wheel 14 is shown in dashed lines when the rod 19 extends farther out from the strut cylinder 18 (as shown in FIG. 3) during use. A small percentage of the movement of wheel 14 is seen on the deflector frame 24 or at the pivot 121. In other words, the deflector frame 24 remains substantially stationary as the wheel 14 moves up and down in response to variations in the ground terrain.

As the wheel 14 turns to either side about axis 50, regardless of the vertical position of the wheel 14 within the deflector frame 24, the outer end of steering arm 36, which is fixedly attached to the wheel axle 22, moves laterally and thereby steers the deflector frame 24 in synchronization with the wheel 14. As the deflector frame 24 turns with the wheel, the bushing 30 pivots or rotates about the strut cylinder 18 thereby permitting steering of the crop deflector 20.

Although the present invention has been described with reference to preferred embodiments, workers skilled in the art will recognize that changes may be made in form and detail without departing from the spirit and scope of the invention.

What is claimed is:

1. In a vehicle having frame, a wheel, and a shock absorbing suspension assembly including a first part mounted to the frame and a second part mounting the wheel, said first and second parts being mounted for relative movement in a direction along a longitudinal axis of the first part the improvement comprising a crop deflector including:
 a deflector frame pivotally mounted to the first part of the shock absorbing suspension assembly for pivoting about the longitudinal axis;
 a steering control attached to the wheel and to the deflector frame such that the deflector frame pivots on the first part of the shock absorbinq assembly and steers with the wheel;
 a deflector shield; and
 means for attaching the deflector shield to the deflector frame.

2. The improvement as in claim 1, wherein the first part of the shock absorbing assembly comprises a strut and the second part mounting the wheel is rotatable about a longitudinal axis of the strut for steering the wheel, the deflector frame being pivotally mounted to the strut such that the deflector frame rotates about the longitudinal axis of the strut to permit steering the crop deflector as the wheel is steered.

3. The improvement as in claim 2, wherein the deflector frame includes:
 a bushing mounted to the strut for supporting the deflector frame on the strut for pivoting about the longitudinal axis when the deflector frame is steered; and
 a loading arm for supporting the deflector frame and for absorbing loads on the deflector frame tending to load the deflector frame toward the strut, the loading arm having a first end pivotally mounted to the bushing.

4. The improvement as in claim 3, wherein the loading arm is a tubular member having a bend therein such that the loading arm extends from a position adjacent a center portion of the wheel forwardly to a position adjacent a leading edge of the wheel.

5. The improvement as in claim 2, wherein the steering control includes:
 a steering arm for steering the crop deflector in synchronization with the wheel, the steering arm having a first end pivotally mounted to a support for the wheel.

6. The improvement as in claim 5, wherein a second end of the steering arm is attached to the frame by a flexible, tension load absorbing member.

7. The improvement as in claim 1, wherein the deflector shield includes a main portion and a flexible skirt portion at the bottom edge thereof and further comprising spring means for supporting a leading end of the flexible skirt of the deflector shield, relative to the deflector frame.

8. The improvement as in claim 1, wherein the steering control is attached to the wheel and the deflector frame such that the deflector frame remains substantially vertically stationary with respect to the vehicle frame as the wheel travels over rough ground.

9. In combination, a self propelled vehicle having a frame, a wheel, and a shock absorber assembly mounting the wheel to the frame, the shock absorber assembly having a cylinder attached to the frame and a rod attached to a wheel axle and reciprocately mounted within the cylinder, the rod being capable of rotating in the cylinder for steering the wheel; and a crop deflector comprising:
 a deflector frame mounted to the cylinder and coupled to the wheel axle such that the deflector frame rotates about a first axis extending along a longitudinal length of the cylinder and is fixed linearly along the first axis, the deflector frame pivoting on the cylinder as the wheel is steered, the deflector frame being coupled to the wheel such that the wheel and rod are permitted to move axially along the first axis relative to the frame;
 a deflector shield for separating crop rows; and
 means for attaching the deflector shield to the deflector frame.

10. The crop deflector as in claim 9, wherein the deflector frame includes:
 a bushing member rotatably mounted to the cylinder such that the bushing rotates about the first axis but does not move along the first axis, the first axis comprising the steering axis of the wheel.

11. The crop deflector as in claim 10, wherein the deflector frame includes:
 a loading arm for supporting the deflector frame and for reaction loading on the deflector frame during forward movement, a first end of the loading arm being pivotally attached to the bushing and being mounted at one end thereof to the deflector frame to permit the deflector frame reunion in axial position with respect to the cylinder as the shock absorber assembly cushions wheel loading.

12. The crop deflector as in claim 11, wherein a first end of the loading arm is pivotally attached to the bushing about a generally horizontal axis and the second end of the loading arm is fixedly attached to the deflector frame.

13. The crop deflector as in claim 11, wherein the loading arm is a tubular member having a bend therein such that the loading arm extends from a position adjacent a side of the wheel near the center of the wheel to a position ahead of the wheel and substantially on a bisecting plane of the wheel perpendicular to the wheel axis.

14. The crop deflector as in claim 9, wherein the deflector frame further includes:
 a steering arm having an inner end pivotally attached about a substantially horizontal axis with respect to the wheel and having an outer end which is moved laterally as the wheel is steered and being pivotally mounted at the outer end thereof to the deflector frame the steering arm pivoting so that the deflector frame is not substantially loaded as the wheel moves vertically when the shock absorber assembly cushions wheel loading.

15. The crop deflector as in claim 12, wherein the wheel and the deflector frame are coupled by a steering arm having a first end pivotally attached to a support for the wheel about a lateral pivot axis, the pivotal attachment transferring steering movement of the wheel to the steering arm, and a second end of the steering arm being mounted to the deflector frame by a universal pivot member to permit the wheel to move relative to the cylinder without substantially loading the deflector frame, while transferring steering movement of the wheel to the deflector frame.

* * * * *